(12) United States Patent
Fujita et al.

(10) Patent No.: US 7,924,668 B2
(45) Date of Patent: Apr. 12, 2011

(54) WRITE STRATEGY DETERMINING METHOD, OPTICAL DISC RECORDING METHOD, OPTICAL DISC AND OPTICAL DISC APPARATUS

(75) Inventors: Shinji Fujita, Yokohama (JP);
Masahiko Takahashi, Uenohara (JP)

(73) Assignee: Hitachi, Ltd., Tokyo (JP)

( * ) Notice: Subject to any disclaimer, the term of this patent is extended or adjusted under 35 U.S.C. 154(b) by 800 days.

(21) Appl. No.: 11/829,124

(22) Filed: Jul. 27, 2007

(65) Prior Publication Data
US 2008/0025179 A1 Jan. 31, 2008

(30) Foreign Application Priority Data

Jul. 28, 2006 (JP) ................. 2006-205556

(51) Int. Cl.
*G11B 5/00* (2006.01)
(52) U.S. Cl. ............ 369/47.53; 369/53.2; 369/59.11
(58) Field of Classification Search ........... 369/59.11, 369/47.53, 116, 100, 44.27, 53.2, 59.12, 369/53.22
See application file for complete search history.

(56) References Cited

U.S. PATENT DOCUMENTS

| | | | | |
|---|---|---|---|---|
| 5,696,747 A | * | 12/1997 | Bartholomeusz | 369/100 |
| 7,751,290 B2 | * | 7/2010 | Kuijper et al. | 369/53.2 |
| 2003/0058765 A1 | * | 3/2003 | Schreurs et al. | 369/47.53 |
| 2006/0126467 A1 | * | 6/2006 | Roh et al. | 369/47.53 |
| 2006/0239166 A1 | * | 10/2006 | Yu | 369/59.11 |
| 2006/0250921 A1 | * | 11/2006 | Kim et al. | 369/59.11 |
| 2007/0041293 A1 | * | 2/2007 | Lee et al. | 369/47.53 |
| 2007/0047415 A1 | * | 3/2007 | Chang | 369/59.11 |
| 2007/0047417 A1 | * | 3/2007 | Chu et al. | 369/59.12 |
| 2008/0062842 A1 | * | 3/2008 | Kishigami et al. | 369/59.11 |
| 2008/0205210 A1 | * | 8/2008 | Van Endert et al. | 369/44.27 |
| 2009/0046565 A1 | * | 2/2009 | Yuzurihara et al. | 369/116 |
| 2009/0129223 A1 | * | 5/2009 | Kato | 369/47.53 |
| 2009/0296551 A1 | * | 12/2009 | Vlutters | 369/53.22 |

FOREIGN PATENT DOCUMENTS

| | | |
|---|---|---|
| JP | 2000-030254 | 1/2000 |
| JP | 2003-085753 | 3/2003 |
| JP | 2004-046954 | 2/2004 |
| JP | 2004-055115 | 2/2004 |
| JP | 2005-322312 | 11/2005 |

* cited by examiner

*Primary Examiner* — Thuy N Pardo
(74) *Attorney, Agent, or Firm* — Antonelli, Terry, Stout & Kraus, LLP.

(57) ABSTRACT

An optical disc recording method of suppressing variations in the record quality due to variations in an initial strategy of a write strategy using many parameters corresponding to a next-generation large-capacity optical disc. Modulation conditions for recorded data on the optical disc are determined based on a real measurement thereof; an initial strategy that meets the modulation conditions is determined; an optical strategy is determined in which the record quality is best in the vicinity of the initial strategy; and data is recorded on the optical disc, using the optimal strategy.

10 Claims, 8 Drawing Sheets

| dTtop (UNIT : /16Tw) | | RECORD MARK LENGTH | | | |
|---|---|---|---|---|---|
| | | 2Tw | 3Tw | 4Tw | 5Tw OR MORE |
| PRECEDING SPACE LENGTH | 2Tw | 10 | 5 | 6 | 6 |
| | 3Tw | 11 | 6 | 7 | 7 |
| | 4Tw OR MORE | 11 | 7 | 7 | 8 |

WRITE STRATEGY DETERMINING METHOD, OPTICAL DISC RECORDING METHOD, OPTICAL DISC AND OPTICAL DISC APPARATUS

INCORPORATION BY REFERENCE

The present application claims priority from Japanese application JP2006-205556 filed on Jul. 28, 2006, the content of which is hereby incorporated by reference into this application.

BACKGROUND OF THE INVENTION

The present invention relates to a technique for recording information on an optical disc.

JP-A-2003-85753 (Patent literature 1) says: "A recording waveform according to a write strategy in the present embodiment includes a top pulse 40, an intermediate bias part 41 and a last pulse 42. The part of the recording pulse waveform excluding those pulse parts is maintained at a level of read power PR. The write strategy employed in the present invention uses binary write power. The top and last pulses 40 and 42 have first write power Ph, and the intermediate bias part 41 has second write power Pm, which is set so as to be higher than the read power PR and lower than the first write power Ph."

The Patent literature 1 also says: "When a space between adjacent marks is short, it is effective to shift the end positions of the adjacent record marks, thereby forming a shorter mark than the actual one."

JP-A-2000-30254 (Patent literature 2) says: "In a method of recording a shortest mark and other marks on an optical information recording medium, using respective different record strategies, the point is to select a write strategy such that a recording power in which a jitter containing all the record marks or a jitter containing only the shortest record mark is minimum is substantially equal to the recording power in which a deviation from a theoretical value of the longest record mark is minimum."

SUMMARY OF THE INVENTION

An information recording layer of an optical disc such as a DVD-RAM or a DVD-R is arranged to have first and second states different in reflectance wherein the first state is changed reversibly or otherwise irreversibly to the second states depending on the thermal conditions. The optical disc whose state change is reversible is called a rewritable disc while an optical disc whose state change is irreversible is called a write-once type disc. In these optical discs, a laser beam is focused as a fine optical spot on the information recording layer of the disc, and injects local energy to the spot to heat the same, thereby forming a predetermined repeated pattern where the first state (or space) and second state (or mark) are present in a mixed manner, which leads to recording information. Recording of the information using the thermal changes will be influenced by thermal interference in which when a particular mark has been recorded, the heat injected by the laser beam will diffuse, thereby influencing on the formation of marks preceding and following the particular mark. Qualitatively, as the interval or space length between two successive marks is reduced, the heat interference increases and vise versa. Thus, the disc temperature at the start of the mark recording varies depending on the space length. As a result, the head edge of the mark can deviate depending on the space length.

A method of changing an irradiation power level of the laser beam on the time base is called a write strategy. The recording characteristic of an optical disc varies depending on the various physical characteristics, configuration having grooves and recording conditions, such as the record density and speed, of the optical disc. Thus, the write strategy is an important factor that influences the recording performance, and various record strategies have been devised so far.

Recently, a quantity of data handled by optical discs is increasing and hence the density of recorded data goes up steadily. Compared to CDs having a capacity of approximately 700 MB (megabytes), DVDs having a capacity of approximately 4.7 GB (gigabytes) including the aforementioned DVD-RAMs are now used by far more widely. Further, large-capacity next-generation optical discs having 20 GB or more where high-definition videos are recordable for two hours are being developed and available commercially. As an example of the next-generation optical discs, there are Blu-ray Discs (hereinafter referred to as BDs). For BDs, a short-wavelength laser having a wavelength of 405 nm band (blue-violet) is used as a light source with an object lens having an increased numerical aperture of 0.85. 1-7 PP modulation codes are employed for modulation. For DVDs, the mark and space lengths are 3-11 Tw where Tw represents the width of a data detection window whereas for BDs, the mark and space lengths are 2-8 Tw. (Note that for DVDs, a special pattern used for synchronization has 14 Tw, whereas for BDs, the pattern used has 9 Tw.) As a result, the shortest mark and space lengths in a line direction are approximately 0.42 μm for the DVD-RAMs and 0.15 μm for BDs with an interval between adjacent mark and space being physically shorter than before. For the track intervals, the DVD-RAMs have approximately 0.62 μm whereas the BDs have approximately 0.32 μm.

In the large-capacity next-generation optical discs, the mark and space sizes have been physically reduced. Thus, there remarkably appears a problem that the thermal interference due to the energy injected when the mark is recorded varies depending on the space length. If the preceding space length changes, for example, to 2, 3, 4 and 5 Tw or more, and even when marks of the same lengths are recorded, the positions of the head edges of the marks deviates. Thus, fine control of the write strategy is required, including increasing variable parameters to be controlled, and rendering different the respective parameters of the write strategy depending on the preceding space and record mark lengths.

As just described above, in the write strategy having many variable parameters, the method of determining the respective parameters is more important than before.

Generally, the respective parameters of the write strategy are not ensured for orthogonality. Thus, if any particular parameter is changed for optimization, the optimal values of other parameters would change and hence it is very difficult to obtain the optimal values of the respective parameters independently.

A reproduction jitter of recorded data used generally as an evaluation index of the write strategy may not function as the evaluation index because the jitter can be properly measured only for recorded data good to some extent.

Therefore, a kind of trial and error method has been often used in which an initial strategy capable of recording data well to some extent is given and the respective parameters are determined by changing these parameters bit by bit such that the jitter is minimized as the evaluation index. Alternatively, in the case of the write strategy where the number of parameters is small, the prior art technique described in Patent literature 2 was used sometimes.

At all events, since the respective parameters used were determined in the vicinity of the initial strategy, results varied depending on how the initial strategy was given. As a result, it is undesirable for ensuring the recording performance of the optical disc apparatuss or ensuring compatibility between the optical disc apparatuss that the record qualities of the reproduced jitters are uneven. The unevenness of the recorded qualities will be more remarkable as the number of parameters of the write strategy is larger as in the aforementioned large-capacity next-generation optical discs, and the problem is considered to get severer.

As viewed from another angle, although it is not ensured that the evaluation of the conventional write strategy will be performed in an optimal manner by a minimum point search, a method of determining the initial strategy is not sufficiently considered.

It is therefore an object of the present invention to provide a recording method and optical disc for suppressing variations in the record quality due to variations in the initial strategies when determining many parameters of the write strategy corresponding to the next-generation large-capacity optical disc.

In order to solve the above problem, the present invention uses structures described as an example in the claims appended hereto.

According to the present invention, the reliability of the recorded data is improved.

Other objects, features and advantages of the invention will become apparent from the following description of the embodiments of the invention taken in conjunction with the accompanying drawings.

DESCRIPTION OF THE EMBODIMENTS

A method of recording data on a write-once optical disc as an embodiment of the present invention will be described with reference to the accompanying drawings.

Figure 1:
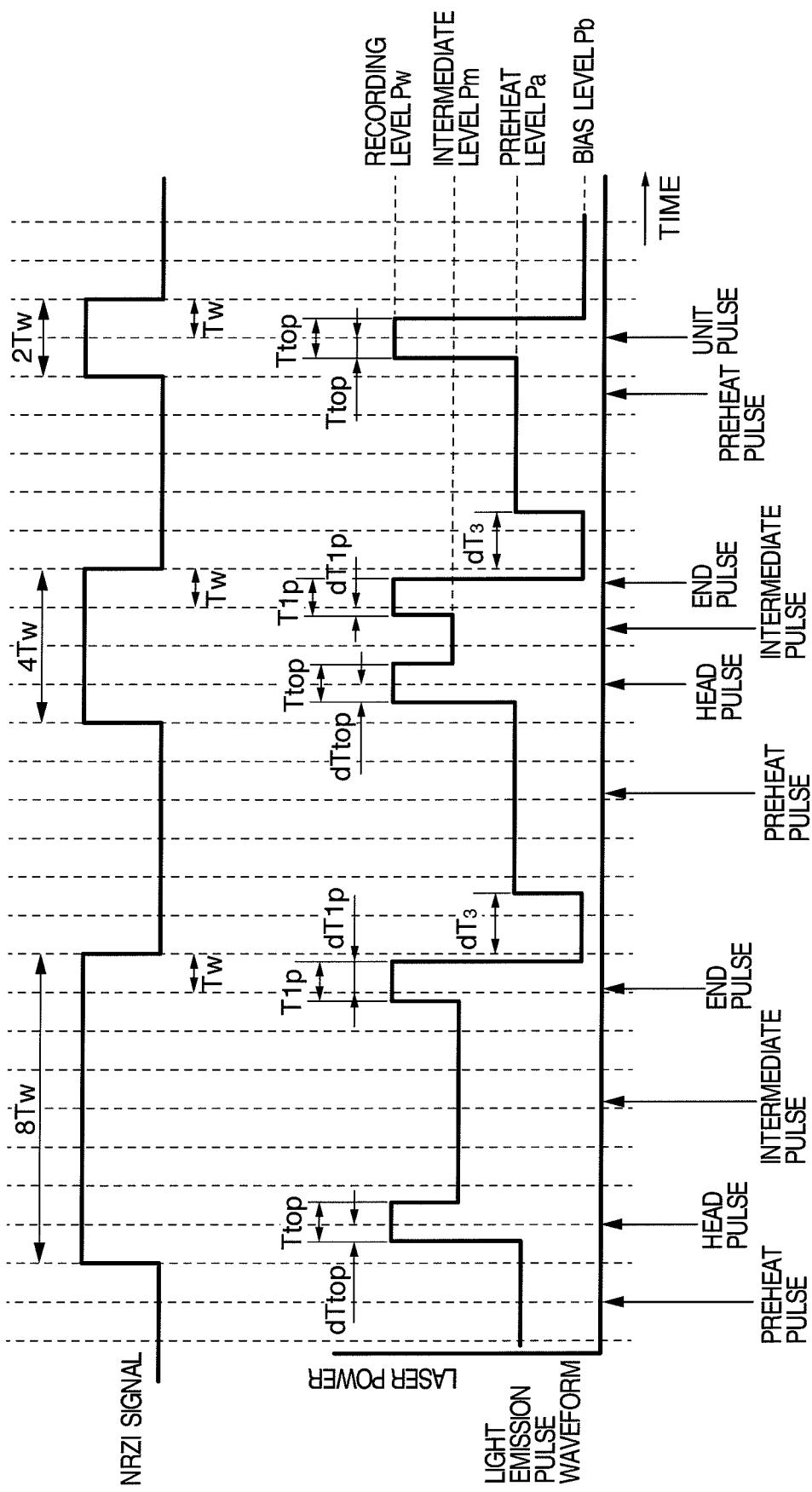
FIG. 1 illustrates a write strategy used in the present invention.

FIG. 1 illustrates a write strategy to be employed in the optical disc recording method of this embodiment. In the present invention, 1-7 PP modulation codes are used The length of a shortest mark or space is 2 Tw which is twice the time width (or detection window width) Tw of a reference clock used for recording and reproduction, and usually, the length of the longest mark or space is 8 Tw (which is 8 times the time width Tw). Note that in the present embodiment there should be a special pattern for synchronization where 9 Tw (or 9 times the time width Tw) should be the length of a longest mark or space.

In the embodiment, the time width Tw of a reference clock used in standard reproduction should be 15.15 ns and that used in recording is 3.79 ns corresponding to a 4 times speed.

When an NRZI signal is given indicative of information to be recorded on the optical disc in a time-series manner, this signal is converted to time-series changes of the laser beam power level or an emitted light pulse waveform by an appropriate signal processor.

Four power levels are set which include a write level Pw, an intermediate level Pm, a preheat level Ps, and a bias level Pb. Supposing that the recording film of the optical disc is in a first state ("space" in this embodiment) in an initial state, the recording film is changeable from the first state to a second state ("mark" in this embodiment) by irradiating the recording film with the laser beam at the write level Pw. The intermediate level Pm is equal to or less than the write level Pw. The recording film can be shifted from the first level to the second level by irradiating the recording film with the laser beam at the intermediate level Pm following the write level Pw. The preheat level Ps is lower than the intermediate level Pm. The recording film should not shift from the first state to the second state only with a rise in the recording film temperature due to irradiation of the laser beam at the preheat level Ps. The bias level Pb is equal to or less than the preheat level Ps.

If a mark whose length is 4 Tw or more is formed on the recording film (or when the length of the NRZI signal used is 4 Tw or more), an irradiation duration at the intermediate level Pm having a length depending on the mark length is provided following the irradiation duration at the write level Pw. Then, a second irradiation period at the recording level Pw is further provided following the irradiation period at the intermediate level Pm. Mark head and end edge-side light pulses at the write level Pw between which the irradiation duration at the intermediate level Pm is present are hereinafter referred to as head and end pulses, respectively.

When the mark length is 2 or 3 Tw, no irradiation duration at the intermediate level is provided and a laser beam at the write level Pw is irradiated in the form of a single pulse. For convenience's sake, the single pulse is also referred to as the head pulse.

When the mark lengths are 2 and 3 Tw, an irradiation duration at the bias level Pb is provided following the head pulse. When the mark length is 4 Tw or more, an irradiation duration at the bias level Pb is provided following the end pulse.

Before the head pulse, an irradiation duration at the preheat level Ps of the predetermined length is provided. A light pulse of the irradiation duration is referred to as a preheat pulse.

The definitions of the time (or position) and irradiation time (or width) of each pulse in the embodiment will be described. The time when the head pulse rises precedes by a displacement time dTtop relative to a reference time which has elapsed by 1 Tw from a rise of the NRZI. When the head pulse rises the displacement time dTtop after the reference time, it should have a negative value. The irradiation time duration Ttop of the head pulse should be a time duration from the rise of the head pulse to its fall. The time at which the end pulse falls precedes by a displacement time dTlp relative to a second reference time that precedes by 1 Tw relative to the time when the NRZI falls. When the end pulse falls a displacement time dTlp after the second reference time, it should have a negative value. The irradiation time duration Tlp of the end pulse should be a time duration from the rise of the end pulse to its fall. The rise time of the preheat pulse, or the end time of cooling, precedes by a displacement time dTs relative to a third reference time when the NEZI falls. Like dTtop and dTlp, when the preheat pulse rises after lapse of the displacement time dTs relative to the reference time, it should have a negative value.

In the present invention, each of the dTtop, Ttop, dTlp, Tlp, and dTs values is defined as the sum of linear and nonlinear terms for the reference clock Tw. For example, dTtop is defined in the following expression.

$$dTtop = a \cdot Tw/n + b \cdot t$$

where n is a predetermined integer, and Tw/n represents a pulse resolution. Letter t is a predetermined time duration which is not dependent on Tw. Letters a an b represent respective integer coefficients of the two terms. In this embodiment, for convenience of explanation, dTtop should be defined only with linear terms and n should be 16. However, the present invention is not limited to these particular examples. Conversely, dTtop may be defined only with nonlinear terms. Alternatively, it may include parameters defined as the sum of linear and nonlinear terms and parameters defined only with linear terms in a mixed manner.

Figures 2, 3:
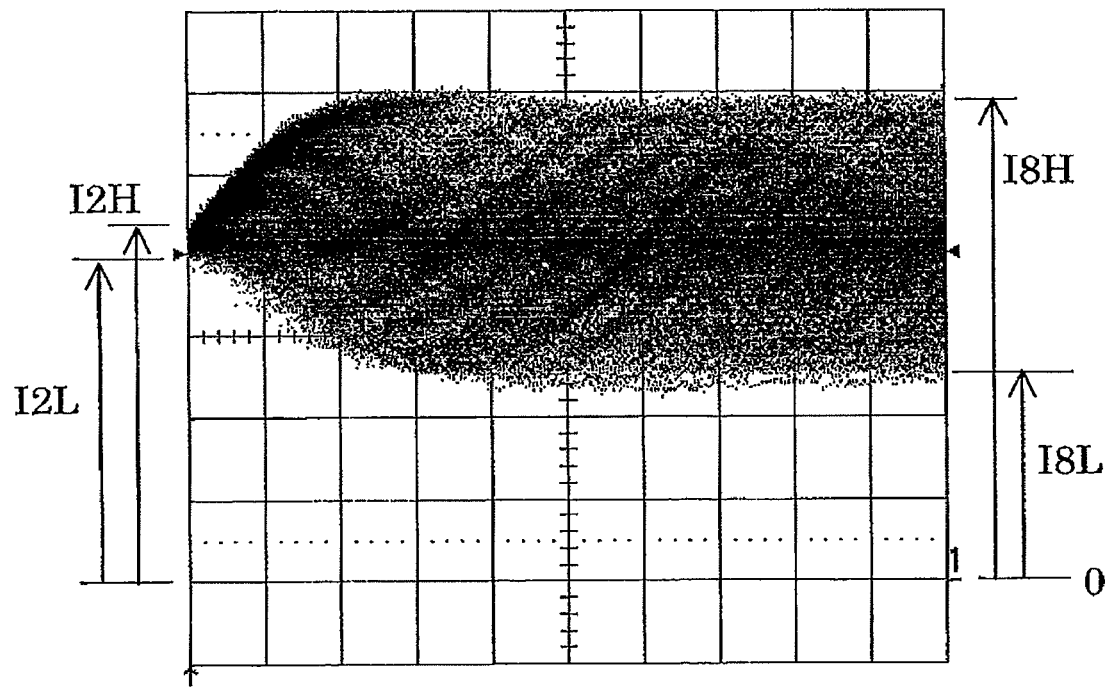
FIG. 2 shows a lookup table for a parameter dTtop of the write strategy in the present invention.
FIG. 3 illustrates a reproduced signal waveform and a modulation definition in the present invention.

In the present embodiment, in order to deal with the aforementioned problem of heat interference, the dTtop and Ttop each are definable as a parameter varying depending on a respective one of combinations of prespace and record mark lengths. More specifically, as shown in a lookup table of FIG. 2, the preceding space lengths are divided into three classes for 2, 3 and 4-9 Tw, respectively, and the record marks into four classes for 2, 3, 4 and 5-9 Tw, respectively. Thus, the parameters correspond to 12 combinations. While in FIG. 2 dTtop is illustrated as an example, this applies also to Ttop likewise.

For each of dTlp and Tlp, the record marks are divided into two classes for 4 and 5-9 Tw, respectively, each as a different parameter. For dTs, the record marks are classified into four classes for 2, 3, 4 and 5-9 Tw, respectively, each also as a different parameter.

Note that the present invention is not limited to combinations of the aforementioned prespaces and record marks, but different combinations of prespaces and record marks may be used whose lengths are, for example, 2, 3, 4 and 5-9 Tw; and 2, 3, and 4-9 Tw, respectively. Alternatively, combinations of prespaces of three (or four) different lengths and record marks of three (or four) different lengths may be used. Generally, as the number of classifications increases, finer control is possible whereas as the number of classifications decreases, the number of items of parameter information and the storage areas on a disc and on a disc apparatus which store the parameter information decreases. Therefore, it is recommended that a preferred combination is selected for the whole system.

In the present invention, a modulation degree (herein after referred simply to as modulation) is specified as a necessary condition for the write strategy. The modulation is defined, in a reproduced signal waveform of FIG. 3, as a ratio of an 8 Tw signal amplitude (representing the difference between a signal level I8H of an 8 Tw space and a signal level I8L of an 8 Tw mark) to a signal level I8H of an 8 Tw space (which substantially coincides with an nonwritten level, which can be referred to as a mirror level) where the reflectance is maximum in the following expression:

$$(I8H-I8L)/I8H$$

A method of determining a modulation condition for the initial strategy employed in the present invention will be described below.

First, in order to record a repeated pattern of 8 Tws, the respective parameters of a write strategy of 8 Tw are temporarily determined. Since the number of combinations of preceding spaces and record marks is one, the number of parameters is 9 in all: that is, one each of dTtop, Ttop, dTlp, Tlp and dTs; and Pw, Pm, Ps and Pb. It is assumed that among these parameters, dTtop, Ttop, Tlp, dTs, Pw, Ps and Pb have fixed values, and for example, dTtop=8/16 Tw, Ttop=20/16 Tw, Tlp=16/16 Tw, dTs=0/16 Tw, Pw=9 mW, Ps=0.3 mW, and Pb=0.3 mW. Here, Ps=Pb implies giving no preheat, and dTs may be indefinite. Parameters dTtop, Ttop and Tlp each are preferably determined such that sufficient pulse widths are ensured for a rise/fall time of the laser and that when a write strategy of 4 Tw is set using the same parameter values as used in the 8 Tw write strategy, the irradiation time duration at the intermediate level Pm is not excessively short. Whether or not Pw is appropriate write power must be determined in a trial and error manner by actually writing the repeated pattern and ascertaining the modulation for each of the conditions; i.e., the parameter values of Ttop, Tlp, etc., and the recording sensitivity and speed of the disc because there is tradeoff relation among Pw and the respective conditions. In this stage, a value determined roughly by using empirical values on other discs is sufficient to use as Pw.

It is assumed that Pm is a variable parameter, which is set, for example, to 0.5, 0.6, 0.7, . . . , or 1 times Pw. In this embodiment, initially, it is set to 0.5 times Pw. The value of dTlp is set depending on Pm, as will be described below. Initially, dTpl is set, for example, to 0/16 Tw.

A repeated pattern of marks and spaces each of 8 Tw is recorded on the disc in a write strategy in which the respective parameters are temporarily determined as described above. When the amplitude of a signal reproduced from the recorded data is obviously small, Pw is reset to a larger value whereas when a decrease in the mirror level appears, Pw is reset to a smaller appropriate value.

Figure 4:
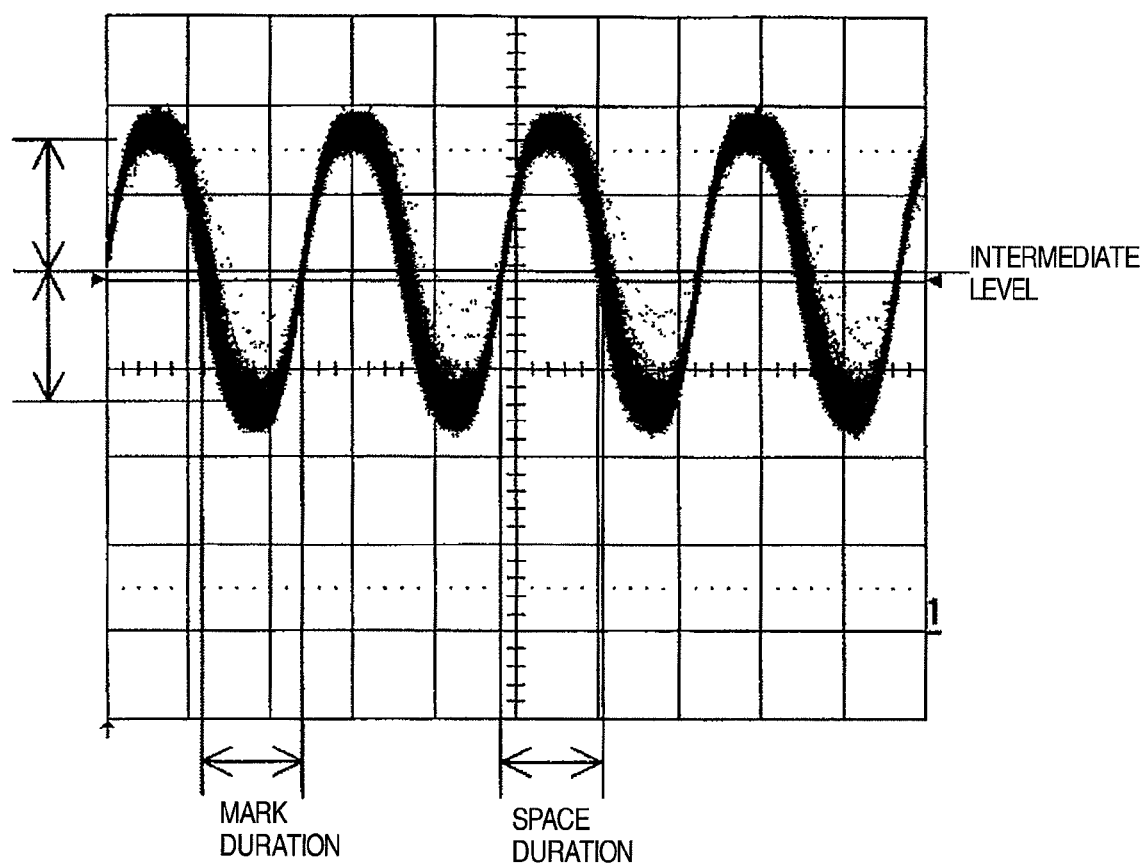
FIG. 4 illustrates a repeated signal waveform of 8-Tw marks and 8-Tw spaces in the present invention.

Next, the repeated pattern of marks and spaces each of 8 Tw is recorded on the disc in a write strategy where Pw is re-set to an appropriate value. By measuring a ratio in duration of the mark to the space where an intermediate level between the 8 Tw mark and 8 Tw space signal levels is a threshold value, as shown in FIG. 4, the ratio in length of the mark to the space is calculated. Then, the recording and measurement are repeated while changing dTlp so that the ratio in length of the mark to the space is roughly 1 (unity). When the mark length is short compared to the space length, dTlp is shifted in the negative direction, thereby increasing the irradiation duration of the intermediate power whereas, conversely, when the mark length is large compared to the space length, dTlp is shifted in the positive direction, thereby reducing the irradiation duration of the intermediate power, which leads to adjusting the length of the recorded mark.

Alternatively, in an AC coupled signal waveform, the signal amplitude on the mark side is rendered roughly coincident with that on the space side, thereby determining the dTlp.

Figure 5:
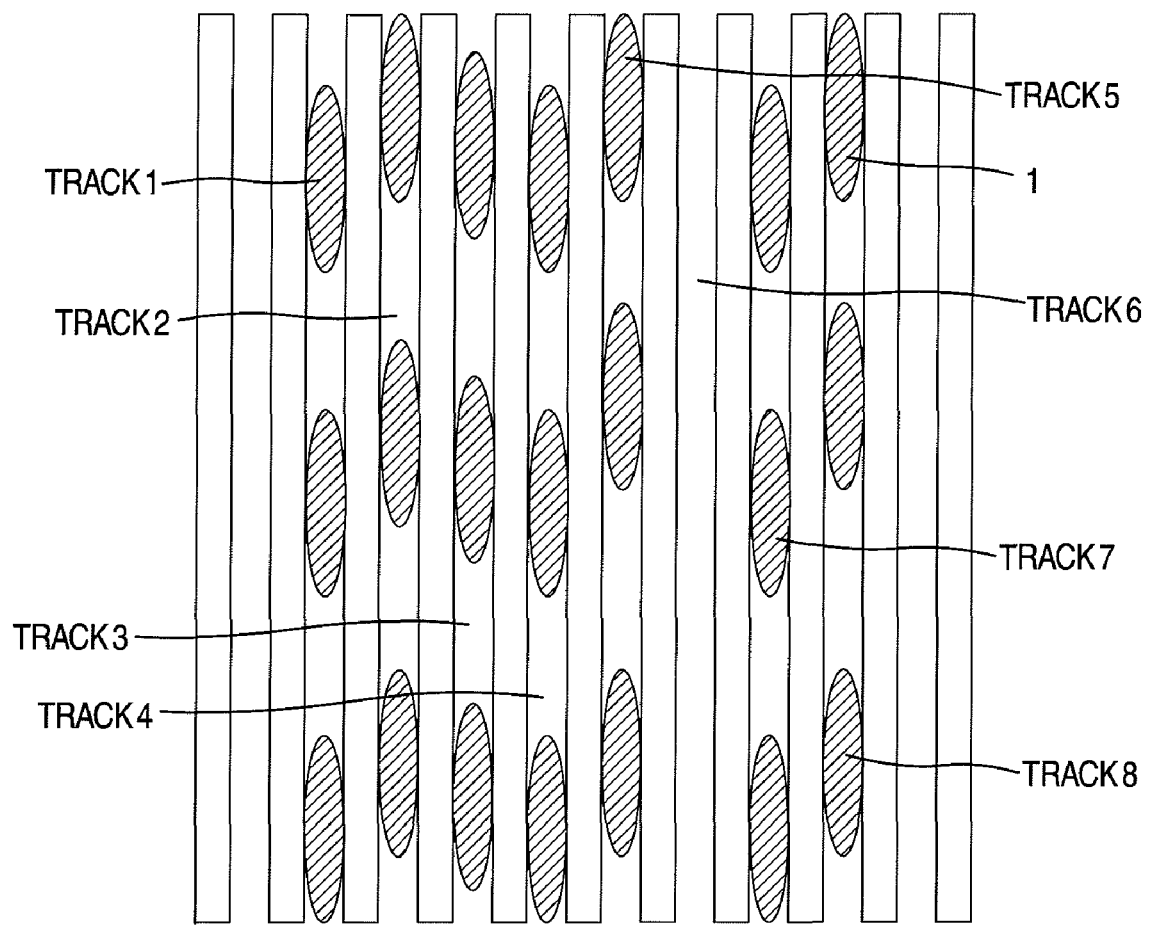
FIG. 5 shows a layout of data recording tracks when the modulation conditions for the initial strategy are determined in the present invention.

A repeated pattern of marks and spaces each of 8 Tw where the mark roughly coincides in length with the space, as obtained in accordance with the procedures just mentioned, is recorded on the disc in a track layout such as shown in FIG. 5. More particularly, tracks 1-5 are recorded successively, a track 6 is left unrecorded, and then tracks 7 and 8 are recorded successively.

The signal level of the track 3 is then measured using a spectrum analyzer. This signal level is hereinafter referred to as an 8 Tw carrier level. Since in the embodiment 1 Tw is 15.15 ns in the standard reproduction, the frequency of the 8 Tw repeated pattern is 4.125 MHz.

In an unrecorded track 6, the level of a signal of 4.125 MHz is measured as in the track 3. The signal observed here is mainly a cross talk based on signals recorded on the tracks 5 and 6 between which the track 6 is present, and the level of the signal will be hereinafter referred to as an 8 Tw cross talk level.

Returning again to the track 3, the aforementioned modulation is now measured, using an oscilloscope this time.

Then, Pm is re-set to 0.6 times Pw, the 8 Tw repeated pattern is recorded on the disc, and then dTlp is determined so that the mark length substantially coincides with the space length. In this case, the repeated pattern is recorded in the predetermined track layout, and then the carrier level, cross talk level and modulation are measured. Further, the series of processes are repeated while changing Pm sequentially to 0.7, 0.8 Pw, . . . .

Then, an evaluation index α is calculated from the measured values of the carrier level, cross talk level, and modulation for each set Pm value:

$$\alpha = k*C - CT$$

where C is the 8 Tw carrier level, CT the 8 Tw cross talk level, and k a weighting coefficient that compensates for a difference in influences exerted on the recorded qualities of C and CT. In the present embodiment, k=4. The arithmetic expression is one example for calculating the evaluation index α, and another expression may be used in which α is calculated based on C and CT.

The range of modulation degrees that can be measured varies depending on the set Pw value. Thus, the set Pw value is changed in a more appropriate range, and the aforementioned series of operations are performed. That is, Pm is set to several values, dTlp is determined such that the mark and space lengths of the 8 Tw repeated pattern substantially coincide for each of the set Pm values, and then the carrier level, cross talk level and modulation are measured.

Figure 6:
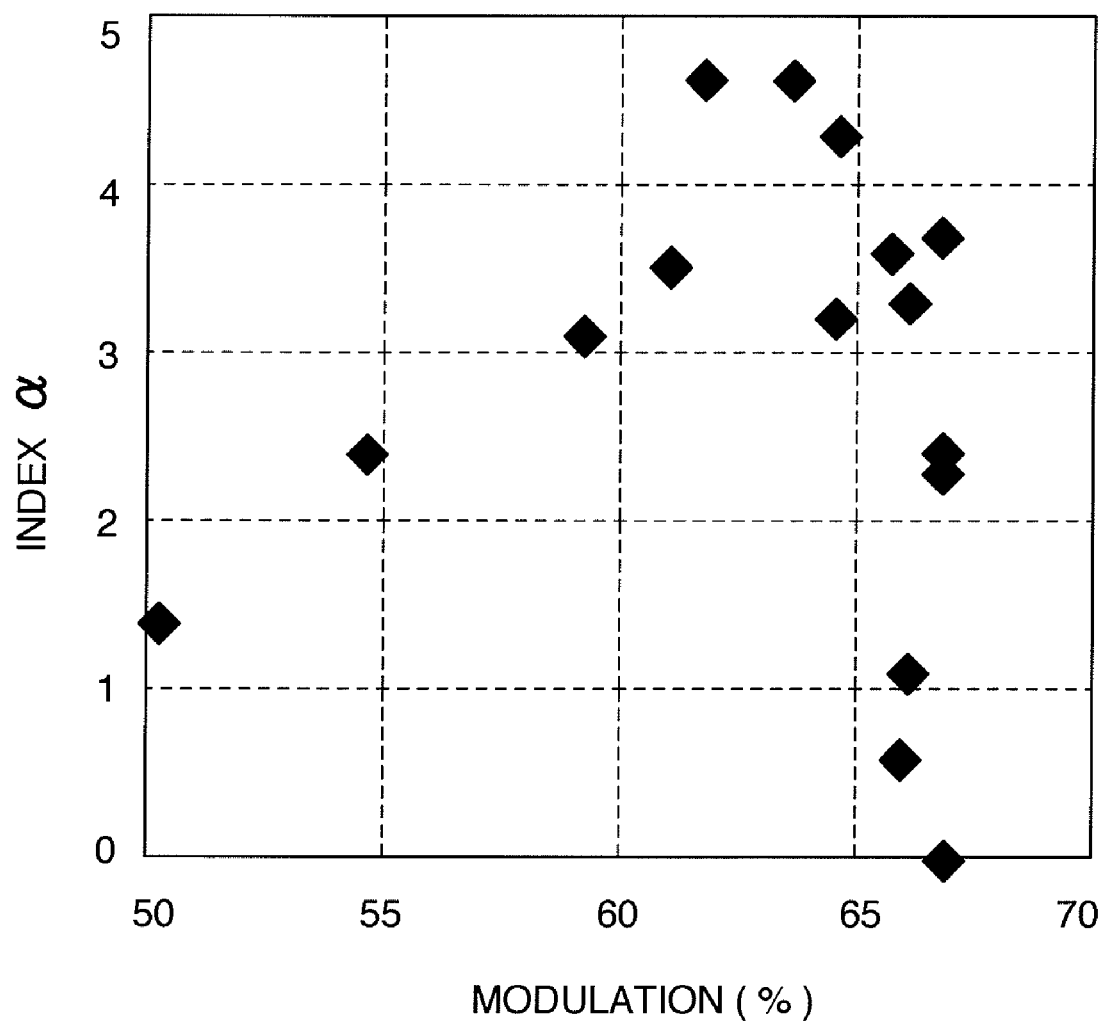
FIG. 6 shows evaluation plots when the initial strategy modulation conditions are determined in the present invention.

As illustrated in FIG. 6, results of measurement of a modulation for each of Pw and Pm are plotted on an X-axis and evaluation indexes α are plotted on the Y-axis.

In FIG. 6, the evaluation index α is peak when the modulation is 61-64%. The evaluation index α tends to decrease leftward in a range of 60% or less of the modulation, decrease leftward, and be saturated in the vicinity of 67%. In the present embodiment, the range of 61-65% where the evaluation index α is peak is determined as a necessary condition for the modulation of the initial strategy.

Then, the respective parameters are determined in the initial strategy. As described above, four Pw, Pm, Ps and Pb parameters are determined for power. For the light emission timing, 12 different dTtop and 12 different Ttop parameters are determined for each of the combinations of prespaces and record marks; 2 different dTlp and 2 different Tlp parameters are determined for each record mark; and 4 different dTs parameters are determined for each record mark. That is, 36 parameters in all are determined.

The value of Pm in the write strategy where the evaluation index α is maximum is treated as a provisional value of Pm in the initial strategy. The provisional Pm value is 5.5 mW in this embodiment. Pb should be 0.3 mW which is the same as the reproduced power.

Each of dTtop, Ttop, dTlp, Tlp for 4 and 5-9 Tw record marks is set to be a corresponding one of the values used in recording the 8 Tw repeated pattern and the same values are used without regard to the classification of the preceding space lengths. When, for the 4Tw record mark, the irradiation duration of the intermediate power is short and, for example, 0.5 Tw or more cannot be ensured, Ttop and Tlp for 4 Tw are set to values smaller than Ttop and Tlp for 5-9 Tw. Alternatively, Ttop and Tlp for 5-9 Tw also may be re-set to smaller values.

In ensuring the record qualities of all the marks and spaces, the record qualities (or jitters) of the shortest mark and space are dominant. However, since in the embodiment the shortest mark and space have the 2 Tw length, it is especially important to ensure the record qualities of the 2 Tw mark and 2 Tw space. Therefore, in the initial stage, it is preferable that n levels are set for each of the parameters for the write strategy of 2 Tw, and then the corresponding record qualities are compared without limiting the number of parameters to one.

In the present embodiment, each of a top pulse width Ttop of the 2 Tw record mark, and combinations of dTs and Ps related to the preheat quantity is given three levels. Thus, for example, Ttop has a first, a second and a third level of 16/16, 20/16 and 24/16 Tw, respectively. Each of the combinations of dTs and Ps has a first, a second and a third level of −24/16 Tw and 0.3 mW; −24/16 Tw and 2 mW; and −8/16 Tw and 2 mW, respectively: i.e., 9 levels in all.

In the following description, it is assumed that each of Ttop, dTs and Ps is set to the corresponding first level.

The dTtop of the 2 Tw record mark should be the same value (that is 8/16 Tw in this embodiment) as dTtop of the 4-9 Tw record mark. Conversely, the dTs of the 4-9 Tw record mark should be the same value (that is −24/16 Tw in this embodiment) as the dTs of the 2 Tw record mark.

The dTtop and dTs of the 3 Tw record mark should also be the same value as the other record marks. The Ttop should be a value (which is 32/16 Tw), for example, larger by 1 Tw than Ttop of the 2 Tw record mark value by referring to Ttop of the 2 Tw record mark.

In this stage, all the parameters excluding Pw are temporarily determined. Note that Ttop and dTtop of each of the record marks should take the same value irrespective of the classification of the prespace lengths.

Here, Pw is set to any particular value, and then random data is recorded for one track on a disc, for example, as values used in the measurement of the cross talk. The recorded data is then reproduced and their modulation and asymmetry are measured. The asymmetry is a signal evaluation index obtained by normalizing the difference between an average level of the shortest mark and shortest space signal (in the embodiment, of 2 Tw) and an average level of the long mark and long space signal (in the embodiment, of 8 Tw) with the amplitude of the long mark and long space signal, as defined in the following expression:

$$[(I8H+I8L)/2-(I2H+I2L)/2]/(I8H-I8L)$$

where I8H and I8L represent the 8 Tw space signal level and the 8 Tw mark signal level, respectively, as described above, and I2H and I2L similarly represent the 2 Tw space signal level and the 2 Tw mark signal level, respectively.

When the asymmetry is a positive large value, Pw is re-set to a smaller value whereas when the asymmetry is a negative large value, Pw is reset to a larger value. Thus, the record, reproduction and measurement of random patterns are repeated until the asymmetry falls in an appropriate range involving the vicinities of zero, thereby determining Pw. Further, it is ascertained that the modulation is within the range of necessary conditions for the initial strategy.

Then, random data is recorded for one track on a disc with the Pw determined in the above process, the recorded data is reproduced and amounts of deviation of the preedge and postedge of each mark relative to the clock are measured. In this case, the preceding space lengths are divided into three classes for 2, 3 and 4-9 Tw, respectively, the record mark lengths are divided into four classes for 2, 3, 4 and 5-9 Tw, respectively, and those amounts of deviation are measured for each of combinations of the preceding spaces and record marks.

In order to eliminate a deviation of the preedge of 4-9 Tw, dTtop and Ttop are adjusted. When the preedge advances relative to the clock, the set value of dTtop is moved in the negative direction or the set value of Ttop is decreased or both are used in combination. Conversely, when the preedge lags relative to the clock, the set value of dTtop is moved in the positive direction or the set value of Ttop is increased or both are used in combination.

In order to eliminate a deviation of the postedge of 4-9 Tw, dTlp and Tlp are adjusted. When the preedge advances relative to the clock, the set value of dTlp is moved in the negative direction or the set value of Tlop is increased or both are used in combination. Conversely, when the preedge lags relative to the clock, the set value of dTlp is moved in the positive direction or the set value of Tlp is decreased or both are used in combination.

In order to eliminate a deviation of the preedge of 2 and 3 Tw, dTtop is adjusted. As in 4-9Tw, when the preedge advances relative to the clock, the set value of dTtop is moved in the negative direction. Conversely, when the preedge lags relative to the clock, the set value of dTtop is moved in the positive direction.

In order to eliminate a deviation of the postedge of 3 Tw, Ttop is adjusted. When the preedge advances relative to the clock, the set value of Tlp is increased. Conversely, when the preedge lags relative to the clock, the set value of Ttop is decreased.

In order to eliminate a deviation of the postedge of 2 Tw, the postedge of 3-9 Tw is moved relatively and its position is adjusted. More particularly, when the postedge advances relative to the clock, the 2 Tw mark is considered to be short relatively. Thus, the respective parameters are adjusted such that the mark of 3-9 Tw is shortened. Conversely, when the postedge lags relative to the clock, the 2 Tw mark is considered to be long relatively. Thus, the respective parameters are adjusted such that the mark of 3-9 Tw is lengthened.

Alternatively, the respective mark lengths may be measured instead of the deviations of the respective mark edges. In this case, the relation in correspondence between the respective parameters and the results of measurement of the mark lengths is not clear. Thus, although the frequency of use of the trial and error method increases in the adjustment of the respective parameters, the measurement itself is expected to be simplified.

Thus, in the above process, the respective record mark and space lengths of 2-9 Tw are adjusted so as to roughly coincide with their corresponding theoretical values, thereby enabling the jitter measurement. Further, it is expected that the symmetry is in an appropriate range and the modulation meets the aforementioned conditions. The write strategy in this stage is treated as the initial strategy. Especially, in the present invention, the initial strategy where the 2 Tw parameters are not optimized is hereinafter referred to as a local initial strategy.

Next, the respective parameters Pw, Pm and Ps relating to the power are finely adjusted, thereby compensating for a remaining unadjusted deviation of the mark edge. Pw, Pm and Ps are incremented or decremented in small steps around the parameters used in the initial strategy, random signals are recorded on the disc under the respective conditions, the recorded data is reproduced and then jitter is measured. And, Pw, Pm and Ps having minimum jitter are obtained.

The respective parameters dTtop, Ttop, Tlp, dTlp, and dTs relating to the pulse timing are finely adjusted to obtain an optimal strategy in the vicinity of the local initial strategy. Especially, in the present invention, the optimal strategy corresponding to the local initial strategy is hereinafter referred to as a local optimal strategy.

Then, random data is recorded in three continuous track or more with the local optimal strategy, recorded data on a track with recorded data on its either side is reproduced, and the jitter, asymmetry and modulation are measured.

As described above, it is preferable that each of the parameters for the 2 Tw recorded mark is given a plurality of levels at each of which a local initial strategy is set, that a local optimal strategy in the vicinity of a corresponding local initial strategy is calculated, and that the recording qualities obtained in the respective local optimal strategies are compared and verified.

Figure 9:
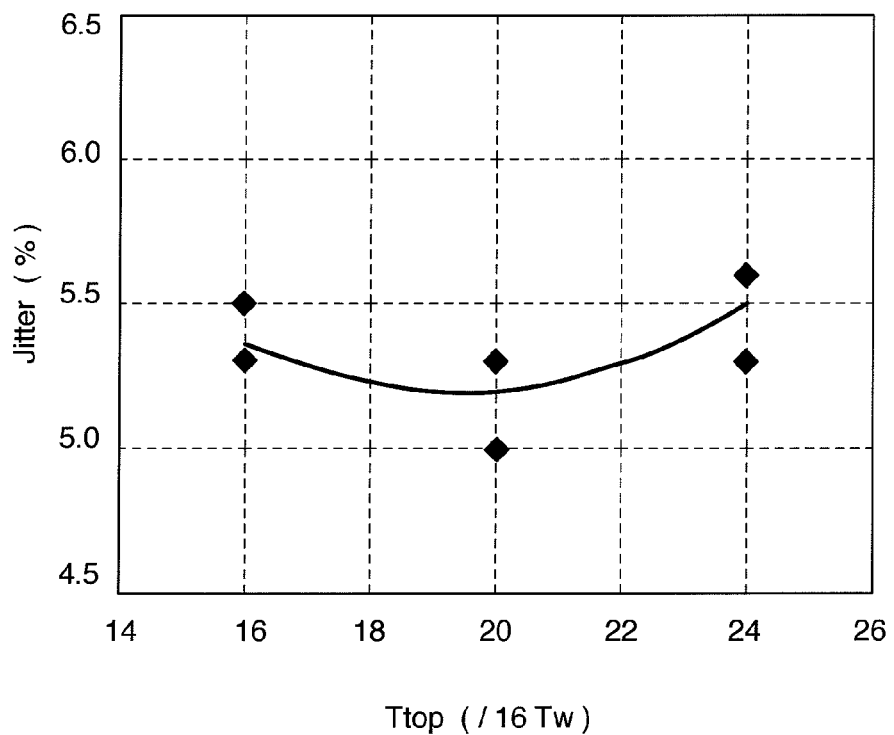
FIG. 9 shows a first evaluation plot used when an optimal 2-Tw parameter is determined in the present invention.
Figure 10:
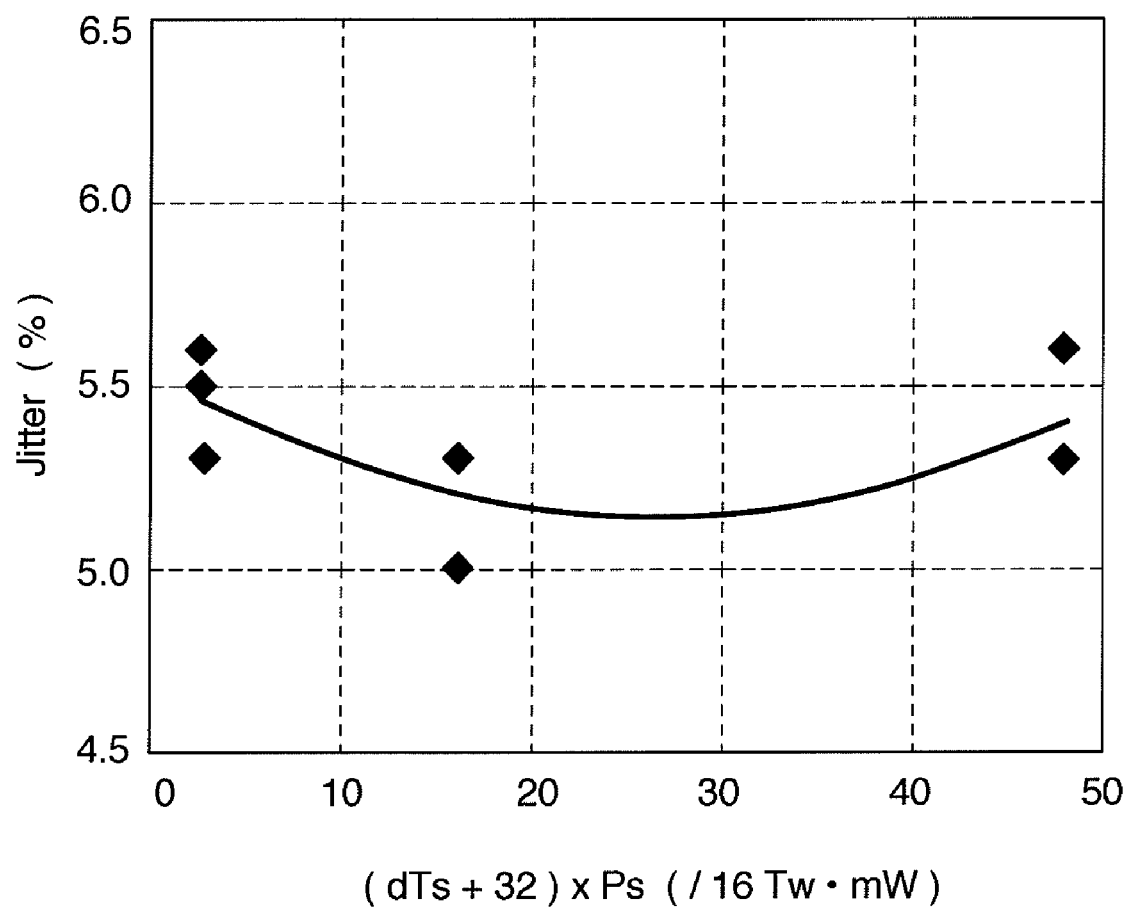
FIG. 10 shows a second evaluation plot used when an optimal 2-Tw parameter is determined in the present invention.

In the present embodiment, the reproduced jitter on the track with recorded data on each side of the track is used as an index of the record quality. In FIG. 9, a 2 Tw pulse width Ttop and the reproduced jitter are plotted on the horizontal and vertical axes, respectively. In FIG. 10, a preheat quantity, (dTs+32/16)*Ps, and the reproduced jitter are plotted on the horizontal and vertical axes, respectively. FIGS. 9 and 10 both illustrate an approximate conic. In FIG. 9, the reproduced jitter is minimum when Ttop is in a range of 19/16-20/16 Tw. In FIG. 10, the reproduced jitter is minimum when the preheat quantity is in a range of 22/16-30/16 Tw-mw. From this, in the present embodiment the optimal 2 Tw parameters are determined as Ttop=20/16 Tw, dTs=−18/16 Tw, and Ps=2 mW.

The indexes of the record quality include various strategy margins such as the respective mark and space lengths, asymmetry and modulation, a change of the reproduced jitter corresponding to a change of the recording power, and a change of the reproduced jitter corresponding to a change in the pulse width. Further, there is a condition that the recording power Pw is preferably small to restrict the maximum light emission power of the laser beam source. Thus, the write strategy may be determined by considering all these things synthetically.

The initial strategy is again determined using the optimal parameters of the 2 Tw recorded marks determined based on the results of the comparison and verification, and then an optimal strategy is sought in the vicinity of the initial strategy and employed as the optimal strategy for the disc of interest.

Alternatively, if the optimal strategy of a different disc similar in recording film characteristic to the disc of interest is known, it can be expected that a roughly good characteristic is obtained even by using the 2 Tw parameters of the different disc to determine the initial strategy.

Figure 7:
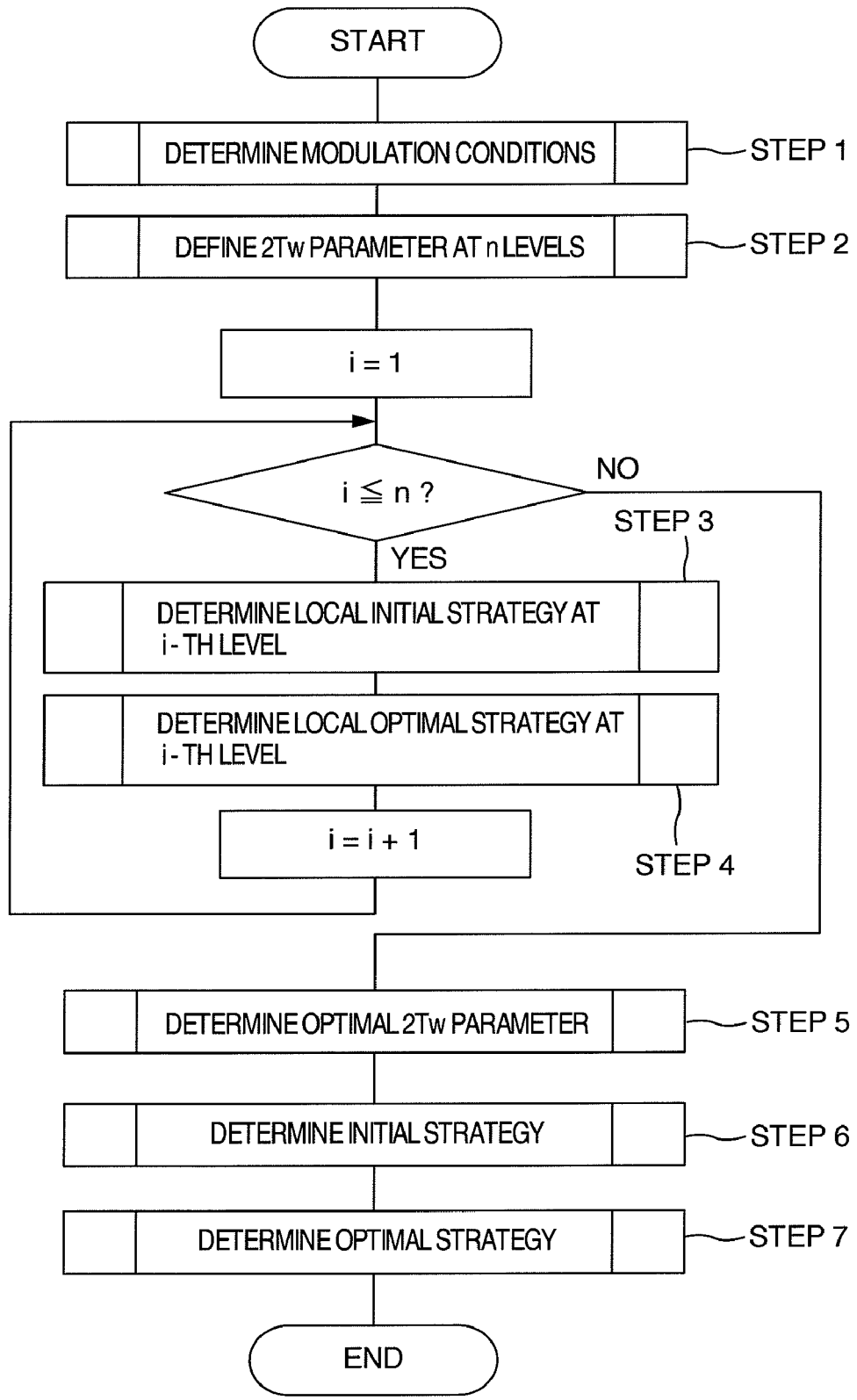
FIG. 7 is a flowchart of an optimal write strategy determining method in the present invention.

A method of determining the write strategy in the present embodiment described in detail above will be organized using a flowchart of FIG. 7.

First, step 1 determines the modulation conditions of the initial strategy from the results of measurement of the carrier and cross talk levels of the 8T repeated signal. Step 2 defines n levels of each of the 2 Tw parameter values. Step 3 determines local initial strategies corresponding to the n levels. Step 4 determines a local optimal strategy in the vicinity of the local initial strategy. Steps 3 and 4 are repeated n times while changing the 2 Tw parameter values to the n respective levels. Step 5 compares and verifies the local optimal strategies in the vicinity of the local initial strategies at the respective levels to determine optimal 2 Tw parameters. Step 6 determines the initial strategy with the optimal 2 Tw parameters as in step 3. Step 7 determines an optimal strategy in the vicinity of the initial strategy as in step 5. Thus, the write strategy determined in step 7 is treated as the optimal strategy for the disc of interest.

Figure 8:
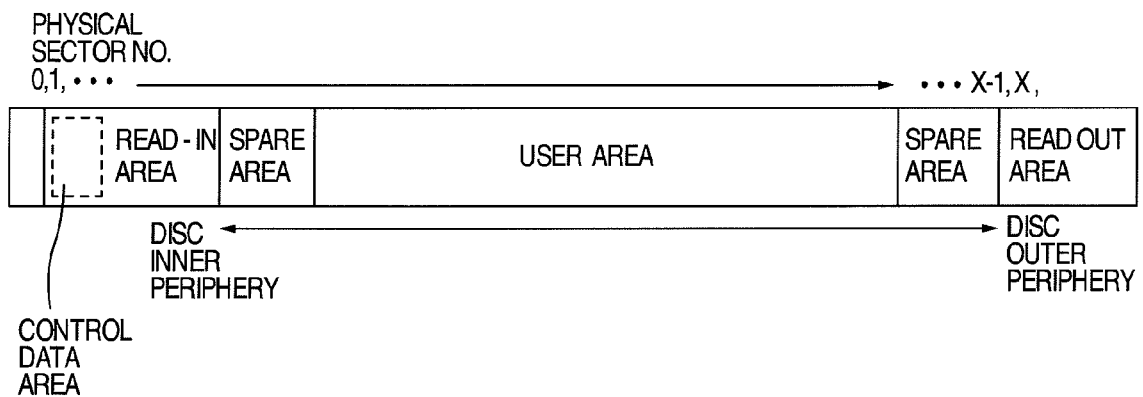
FIG. 8 shows a layout of areas of an optical disc in the present invention.

The optimal strategy of the inventive optical disc obtained in the procedures described above is beforehand stored as one of items of disc information in the control data area of the disc. As shown in FIG. 8, in the present embodiment the control data area is disposed in an innermost-peripheral read-in area different from a user data area where the user is able to record data freely. The optimal strategy is also recorded as disc information in the form of a track wobble along with address information throughout the whole surface of the disc. Note that predetermined bits of the control data are defined beforehand so as to correspond to the respective parameters of the write strategy.

While there can be a plurality of write strategies to be recorded as the disc information in the control data area, for example, for each of the recording speeds, in the inventive optical disc at least one of the plurality of record strategies is determined in accordance with the procedures of the present invention.

Alternatively, the control data area may be disposed in the read-out area along the outermost periphery of the disc.

The inventive optical disc apparatus reproduces data on the inventive optical disc, and reads out predetermined bit information of the control data as the disc information, thereby acquiring the respective parameter values of the optimal strategy stored on the disc. The optical disc apparatus adjusts the respective parameters as described above, using the optimal write strategy as the initial one, and then again acquiring an optimal strategy in the vicinity of the initial strategy.

The optimal parameter of the write strategy can vary among optical disc apparatuses, mainly due to the performance of the optical pickup used including, for example, aberration performance of a light spot and rise/fall performance of the laser beam. By virtue of the measure of the present invention described above, however, the unevenness of recording qualities among the respective disc apparatuses can be suppressed. According to the present invention, the time required to determine the write strategy, and a test write area of the optical disc can be reduced compared to the case in which the initial strategy is determined for each of the optical disc apparatuses.

While, in the embodiment, the so-called castle type strategies have been illustrated which include use of the head and end pulses which irradiate Pw as a write strategy for a long mark, the present invention is not limited to these particular cases. For example, a so-called L-like strategy that includes use of only a head pulse as the irradiating one for Pw and a so-called multi-pulse type strategy that includes use of a comb-type pulse as the Pw irradiation pulse in addition to the head pulse are expected to produce similar advantages in almost similar processes.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. A method of determining a write strategy to record data by irradiating an optical disc with a laser beam, the method comprising:
    a first step of determining modulation conditions for the data to be recorded on the optical disc, by
        recording repeated data of marks and spaces of a predetermined length on the optical disc, and
        reproducing the data, measuring a signal level, a cross talk level and a modulation of the data, and then determining the modulation conditions based on the results of the measurement;
    a second step of determining a first strategy that meets the modulation conditions; and
    a third step of measuring a record quality in the vicinity of the first strategy, and determining a second strategy;
    wherein the second step comprises:
        determining parameters of a write strategy for a shortest mark and then recording data on the parameters on the optical disc; and
        reproducing the data, measuring its asymmetry and mark edge position or mark length, and then determining the respective parameters of the first strategy based on results of the measurement.

2. The method of claim 1, wherein:
    the second step further comprises determining each of the parameters of the write strategy for the shortest mark at a plurality of levels; and
    the third step comprises measuring a record quality of the shortest mark at a respective one of the plurality of levels and then determining the second strategy based on results of the measurement.

3. The method of claim 1, wherein:
    the second step comprises determining each of the parameters of the write strategy for the shortest mark at a plurality of levels; and
    the third step comprises measuring a record quality of the shortest mark at a respective one of the plurality of levels and then determining the second strategy based on results of the measurement.

4. An optical disc wherein information on a recommended write strategy is beforehand recorded in a predetermined control data area of the disc, wherein the recommended write strategy is determined in:
    a first step of determining modulation conditions for data to be recorded on the optical disc;
    a second step of determining a first strategy that meets the modulation conditions; and
    a third step of measuring a record quality of the data in the vicinity of the first strategy, and then determining the recommended write strategy;
    wherein the second step comprises:
        determining parameters of a write strategy for a shortest mark and then recording data on the parameters on the optical disc; and
        reproducing the data, measuring its asymmetry and mark edge position or mark length, and then determining the respective parameters of the first strategy based on results of the measurement.

5. The optical disc of claim 4, wherein the first step comprises:
    recording repeated data of marks and spaces of a predetermined length on the optical disc; and
    reproducing the data, measuring a signal level, a cross talk level and a modulation of the data, and then determining the modulation conditions based on the results of the measurement.

6. The optical disc of claim 4, wherein:
    the second step further comprises determining each of the parameters of the write strategy for the shortest mark at a plurality of levels; and
    the third step comprises measuring a record quality of the shortest mark at a respective one of the plurality of levels and then determining the second strategy based on results of the measurement.

7. An optical disc recording method that records data on an optical disc by irradiating the optical disc with a laser beam, comprising:
- a first step of determining modulation conditions for the data to be recorded on the optical disc;
- a second step of determining a first strategy that meets the modulation conditions;
- a third step of measuring a record quality of the data in the vicinity of the first strategy and then determining a second strategy; and
- a final step of recording data using the second strategy;
- wherein the first step comprises:
  - recording repeated data of marks and spaces of a predetermined length on the optical disc; and
  - reproducing the data, measuring a signal level, a cross talk level and a modulation of the data, and then determining the modulation conditions based on the results of the measurement; and
- wherein the second step comprises:
  - determining parameters of a write strategy for a shortest mark and then recording data on the parameters on the optical disc; and
  - reproducing the data, measuring its asymmetry and mark edge position or mark length, and then determining the respective parameters of the first strategy based on results of the measurement.

8. The optical disc recording method of claim 7, wherein:
- the second step further comprises determining each of the parameters of the write strategy for the shortest mark at a plurality of levels; and
- the third step comprises measuring a record quality of the shortest mark at a respective one of the plurality of levels and then determining the second strategy based on results of the measurement.

9. An optical disc apparatus for recording or reproducing information to or from an optical disc where information on a recommended write strategy is beforehand recorded in a predetermined control data area of the disc, and wherein the recommended write strategy is determined in:
- a first step of determining modulation conditions for data to be recorded on the optical disc;
- a second step of determining a first strategy that meets the modulation conditions; and
- a third step of measuring the record quality of the data in the vicinity of the first strategy and then determining the recommended strategy;
- wherein the first step comprises:
  - recording repeated data of marks and spaces of a predetermined length on the optical disc; and
  - reproducing the data, measuring a signal level, a cross talk level and a modulation of the data, and then determining the modulation conditions based on the results of the measurement; and
- wherein the second step comprises:
- determining parameters of a write strategy for a shortest mark and then recording data on the parameters on the optical disc; and
- reproducing the data, measuring its asymmetry and mark edge position or mark length, and then determining the respective parameters of the first strategy based on results of the measurement.

10. The optical disc apparatus of claim 9, wherein:
- the second step further comprises determining each of the parameters of the write strategy for the shortest mark at a plurality of levels; and
- the third step comprises measuring a record quality of the shortest mark at a respective one of the plurality of levels and then determining the second strategy based on results of the measurement.

* * * * *